(12) United States Patent
Holbrook

(10) Patent No.: US 10,324,830 B2
(45) Date of Patent: Jun. 18, 2019

(54) CONDITIONAL UPGRADE AND INSTALLATION OF SOFTWARE BASED ON RISK-BASED VALIDATION

(71) Applicant: Terrance Holbrook, Bountiful, UT (US)

(72) Inventor: Terrance Holbrook, Bountiful, UT (US)

( * ) Notice: Subject to any disclaimer, the term of this patent is extended or adjusted under 35 U.S.C. 154(b) by 0 days.

(21) Appl. No.: 15/915,433

(22) Filed: Mar. 8, 2018

(65) Prior Publication Data

US 2019/0138431 A1    May 9, 2019

Related U.S. Application Data

(60) Provisional application No. 62/581,157, filed on Nov. 3, 2017.

(51) Int. Cl.
| | |
|---|---|
| *G06F 9/44* | (2018.01) |
| *G06F 11/36* | (2006.01) |
| *G06F 8/61* | (2018.01) |
| *G06N 7/00* | (2006.01) |
| *G06F 8/65* | (2018.01) |
| *G06N 20/00* | (2019.01) |

(52) U.S. Cl.
CPC .......... *G06F 11/3688* (2013.01); *G06F 8/61* (2013.01); *G06F 8/65* (2013.01); *G06F 11/3676* (2013.01); *G06N 7/005* (2013.01); *G06N 20/00* (2019.01)

(58) Field of Classification Search
None
See application file for complete search history.

(56) References Cited

U.S. PATENT DOCUMENTS

2003/0229890 A1* 12/2003 Lau ........................... G06F 8/65
717/168
2018/0203792 A1* 7/2018 Ekambaram ........ G06F 11/3672

* cited by examiner

*Primary Examiner* — Qamrun Nahar
(74) *Attorney, Agent, or Firm* — Workman Nydegger

(57) ABSTRACT

Embodiments are directed to reducing the number of unit tests performed within a system. In one scenario, a computer system accesses a specified version of an application and evaluates that version of the application to identify connections between software features in the application, and to further identify defects in the software features. The computer system also determines a risk level for the software features, which indicates a likelihood of that software feature causing a software malfunction according to the identified connections or defects. The computer system further generates a feature list that includes, for at least some of the features, a corresponding ongoing risk indicator that indicates the determined likelihood of that feature causing the defect or software malfunction, and performs unit tests against the software application for those features that were indicated as sufficiently likely to cause a defect or software malfunction upon installation or upgrade of the application.

19 Claims, 6 Drawing Sheets

UI 400

Version 2.1.0 ☑ 401

| Feature | Sys. Risk 402 | Upgrade Risk 2.1.0 403 | Test I.D. 404 405 | Pass/Fail 406 | UI (User) Risk 407 |
|---|---|---|---|---|---|
| IC Date | L | L | 1244X | N/A | ☑ Low |
| Limits Prop | H | H  D | 1377B | Pass | ☑ Not Used |
| Numeric Data Type | L | L | 12514 | N/A | ☑ Low |
| Time Capture Data Type | M | L | 1313C | Pass | ☑ Low |
| Yield Data Type | L | M  E | 12178X | Pass | ☑ H |
| Form Launch | H | L | 1113B | Pass | ☑ H |

*Fig. 4*

| Feature | On-Going Risk | Upgrade Risk | Release Risk | Functional Testing Mitigation | UI Testing Automation | Client Impact | Client Testing |
|---|---|---|---|---|---|---|---|
| #1 | H | L | H | H | Y | Y | Y |
| #2 | M | L | M | L | N | N | N |
| #3 | L | H | H | H | Y | Not Used | Not Used |
| #4 | L | H | H | H | Y | Y | Y |
| #5 | H | M | H | H | Y | Y | Y |
| #6 | L | L | L | L | N | L | N |
| #7 | L | L | L | L | N | Not Used | Not Used |
| #7 | M | H | H | H | Y | H | Y |

Fig. 5

CONDITIONAL UPGRADE AND INSTALLATION OF SOFTWARE BASED ON RISK-BASED VALIDATION

CROSS-REFERENCE TO RELATED APPLICATION

This application claims the benefit of and priority to U.S. Provisional Patent Application Ser. No. 62/581,157 filed on Nov. 3, 2017, and entitled "CONDITIONAL UPGRADE AND INSTALLATION OF SOFTWARE BASED ON RISK-BASED VALIDATION," which application is expressly incorporated herein in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Software applications are often updated over time. Each update typically receives a new version number. Each version has new features, bug fixes, or some combination thereof. In some cases, companies or other entities are hesitant to install new versions of software, as the new version may break functionality that was working in the previous version. As a result, companies will often perform extensive tests on new versions of software applications before implementing them in their respective systems. These risk evaluations involve running hundreds or thousands of unit tests to ensure that each feature still performs as it should, and that new features don't break old features.

Installation, operation and performance qualification (IOPQ) are thus performed to validate each software version before deployment. Such tests can take hours, days or even weeks. Due to the extensive nature of these tests, many companies wait multiple versions before changing. Then, when the software finally is upgraded, large changes exist between the new version and the older version. These large changes (e.g. from version 2 to version 5) may then include an even larger number of new features and bug fixes. This, in turn, may result in even more unit tests and more chances that something will fail in the newer version.

BRIEF SUMMARY

Embodiments described herein are directed to methods and systems for reducing the number of unit tests performed within a system. In one embodiment, a computer system accesses a specified version of an application and evaluates that version of the application to identify connections between software features in the application, and to further identify defects in the software features. The computer system also determines a risk level for the software features, which indicates a likelihood of that software feature causing a defect or software malfunction according to the identified connections or defects. The computer system further generates a feature list that includes, for at least some of the features, a corresponding ongoing risk indicator that indicates the determined likelihood of that feature causing the defect or software malfunction, and performs unit tests against the software application for those features that were indicated as sufficiently likely to cause a defect or software malfunction upon installation or upgrade of the application.

In another embodiment, a computer system performs a method for validating a portion of a system using unit tests. The method includes retrieving at least part of an application and analyzing the retrieved part of the application to identify connections between software features in the application portion. The method further includes presenting a list of features that includes a corresponding ongoing risk indicator that indicates a determined likelihood of the software feature causing a defect or software malfunction, and then initializing unit tests configured to test the portion of the software application for those features that were indicated as sufficiently likely to cause a defect or software malfunction upon installation or upgrade of the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 4 illustrates an example of a feature list that includes corresponding risk scores.

FIG. 5 illustrates an alternative example of a feature list that includes corresponding risk scores.

DETAILED DESCRIPTION

Figure 1:
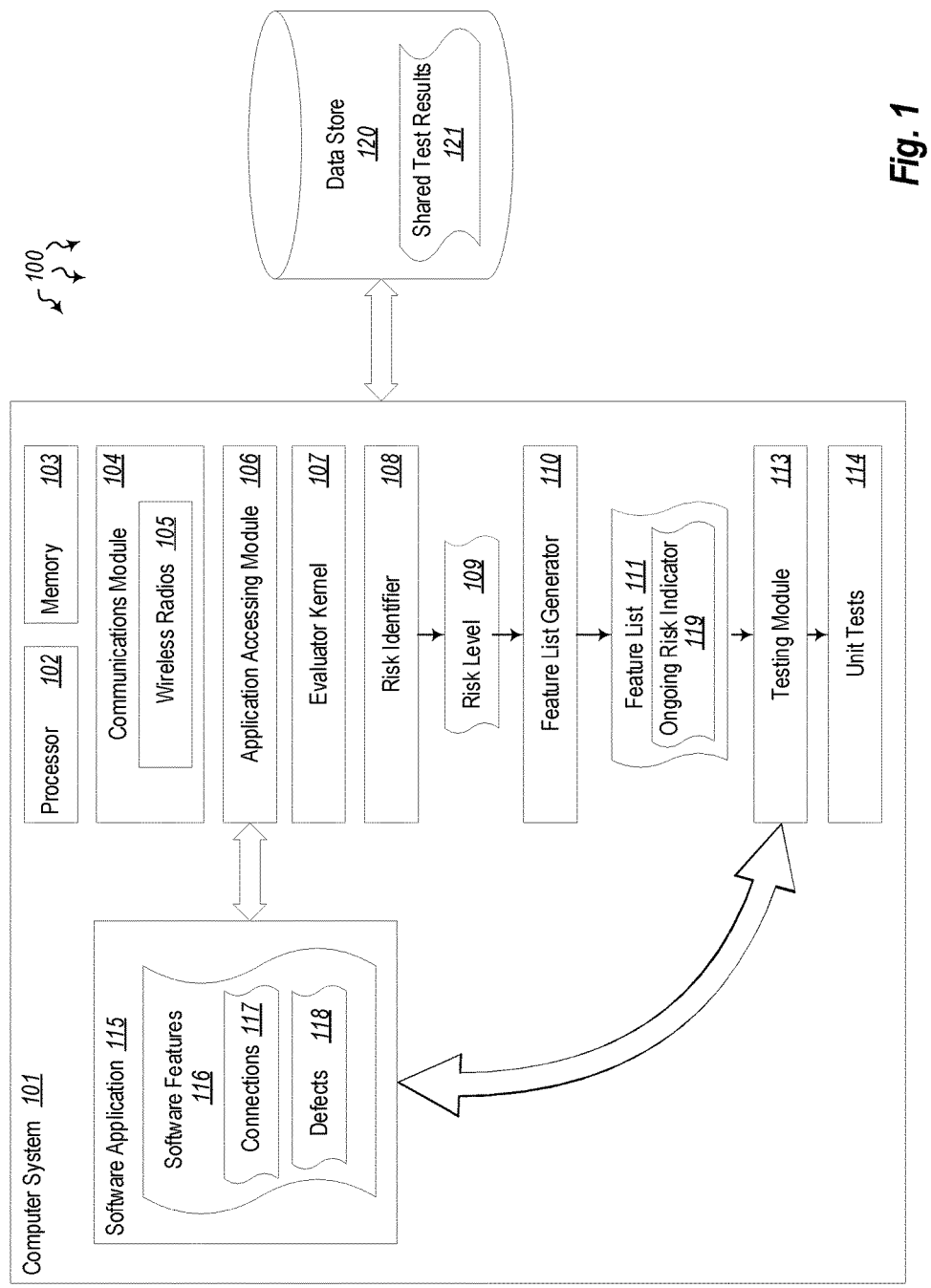
FIG. 1 illustrates an architecture in which embodiments described herein may operate including reducing the number of unit tests performed within a system.

As noted above, embodiments described herein are directed to methods and systems for reducing the number of unit tests performed within a system. In one embodiment, a computer system accesses a specified version of an application and evaluates that version of the application to identify connections between software features in the application, and to further identify defects in the software features. The computer system also determines a risk level for the software features, which indicates a likelihood of that software feature causing a defect or software malfunction according to the identified connections or defects. The computer system further generates a feature list that includes, for at least some of the features, a corresponding ongoing risk indicator that indicates the determined likelihood of that feature causing the defect or software malfunction, and performs unit tests against the software application for those features that were indicated as sufficiently likely to cause a defect or software malfunction upon installation or upgrade of the application.

In another embodiment, a computer system performs a method for validating a portion of a system using unit tests. The method includes retrieving at least part of an application and analyzing the retrieved part of the application to identify connections between software features in the application portion. The method further includes presenting a list of features that includes a corresponding ongoing risk indicator that indicates a determined likelihood of the software feature causing a defect or software malfunction, and then initializing unit tests configured to test the portion of the software application for those features that were indicated as sufficiently likely to cause a defect or software malfunction upon installation or upgrade of the application.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Turning now to the Figures, FIG. 1 illustrates a computer architecture 100 in which at least one embodiment described herein may be employed. The computer architecture 100 includes a computer system 101. The computer system 101 includes at least one processor 102 and at least some system memory 103. The computer system 101 may be any type of local or distributed computer system, including a cloud computer system. The computer system 101 includes modules for performing a variety of different functions. For instance, communications module 104 may be configured to communicate with other computer systems. The communications module 104 may include any wired or wireless communication means that can receive and/or transmit data to or from other computer systems including wireless radios 105 such as WiFi, Bluetooth, cellular and global positioning system (GPS) radios. The communications module 104 may be configured to interact with databases, mobile computing devices (such as mobile phones or tablets), embedded or other types of computer systems.

In some embodiments, the computer system 101 is configured to reduce the number of unit tests performed. As noted above, many times unit tests are avoided because of the extensive amount of time and computing resources they take. Some unit tests may take hours, days or weeks. During this time, the computer systems performing these tests are unavailable to work on other projects. Thus, any reduction in the number of unit tests that need to be performed (and still adequately test the functionality of a software application) result in a direct savings in CPU cycles consumed on the unit tests, memory used, network bandwidth used, and power consumption to run the computer system. In line with these benefits, computer system 101 may be used to determine a risk level associated with a given application or portion of an application and determine whether that application (or portion) actually needs to be tested, or whether it would be ok to use the application without testing it. For simplicity's sake, when referring to testing an application herein, it will be assumed that the entire application or only portions thereof are being tested.

In addition to the processor 102, memory 103 and communications module 104, computer system 101 includes an application accessing module 106. The application accessing module 106 is configured to access a specified version of an application (e.g. application 115). An evaluator kernel 107 then evaluates the specified version of the application to identify one or more connections 117 between software features 116 in the application, and to further identify one or more defects 118 in the software features. The evaluator kernel 107 analyzes source code, including libraries, functions, modules and other application elements to identify connections 117 between the elements. If one element is connected to a large number of other elements, and that gets updated between software versions, there is a higher likelihood that those parts of the application connected to that element will need to be tested. Conversely, if an element has few connections to other elements, even if that element is updated between software versions, there is a low likelihood that those parts of the application that use that element will need to be tested. In this latter case, the risk of something breaking between versions is reduced because the number of connections to the specified element is smaller.

The computer system 101 further includes a risk identifier 108 configured to determine a risk level 109 for one or more of the software features 116. The risk level 109 indicates a likelihood of the software feature causing a defect or software malfunction. Indeed, each software feature 116 may be treated differently in a software update. In some application updates, any one particular feature may or may not be updated. If that feature is not updated, it may not need to be tested at all, or at least not as heavily. If the feature is updated it will likely need to be tested more in depth. This is especially true if that feature has a lot of connections 117 to other software features or elements. Features that have a large number of connections and are updated in a given update will have a higher risk level 109. Features that have a low number of connections and are not updated will have a lower risk level. Other cases where there are a high number of connections, but no update, or a low number of connections and did receive an update will have a reduced but still significant risk level 109. Thus, each upgrade is unique based on which features were updated and how many connections those features had. Moreover, this is compounded if the upgrade changes multiple versions (e.g. from version 2.0 to version 5.0).

The evaluator kernel 107 is also configured to identify defects 118 in a software feature. For instance, the evaluator kernel 107 may identify connections to elements or modules that no longer exist in the updated software application 115. Or, the evaluator kernel 107 may identify incomplete sections or calls to elements that have changed in functionality. As such, when a defect 118 is identified, it may be taken into account by the risk identifier 108, and may raise the risk level 109 for a given software feature, indicating that that software feature does need to be tested. A feature list generator 110 may generate a list of features 111 in the application, and use that feature list to determine an ongoing risk indicator 112. The ongoing risk indicator shows how much risk will be involved if a user runs a given unit test, or omits the test. Indeed, running a unit test to thoroughly test the new functionality between versions greatly reduces the amount of risk of an unknown bug or defect when switching to a new version, but does not eliminate it. Thus, the ongoing risk indicator 112 will usually indicate at least some risk. However, if certain unit tests are strategically skipped because the risk level was identified as being low, the ongoing risk indicator may be raised higher to account for the omitted test.

If the determined risk level 109 is sufficiently high, and/or if the ongoing risk indicator 112 is sufficiently high, the testing module 113 will run those unit tests 114 that need to be run. The testing module 113 will perform unit tests 114 against the software application 115 for those features 116 that were indicated as sufficiently likely to cause a defect 118 or software malfunction upon installation or upgrade of the application.

Figure 2:
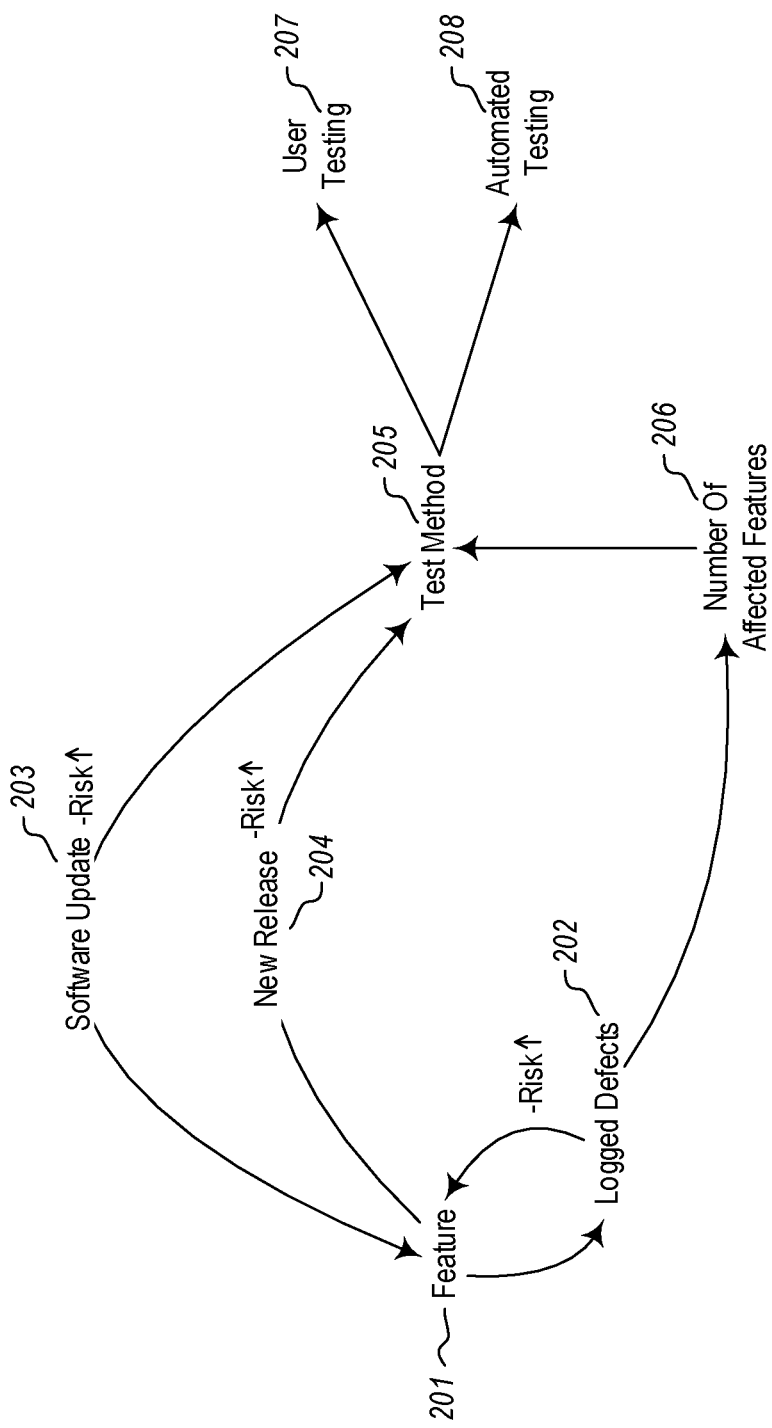
FIG. 2 illustrates an element flow describing an embodiment for reducing the number of unit tests performed within a system

As shown in FIG. 2, a software application may have a number of features 201. Each update or new release of the application typically introduces new features. As features are added, the risk of something breaking between versions goes up. With each software update 203 or each new release 204, the risk of bugs or defects 202 goes up. New test methods 205 are used to test the new features introduced in the software updates 203 or new releases 204. In some cases, the new test methods may themselves introduce new problems if new features are not fully testes or are improperly tested. Each defect 202 may affect a relatively small number of features 206, a relatively large number, or somewhere in between, depending on the number of connections 117 to other software features 116. The test methods 205 are designed to identify potential or actual defects in the software application and particularly in the new features introduced in the update or new release. The test methods 205 may include user testing methods 207, automated testing methods 208, or combinations thereof.

For example, human users may be used to manually test new and previously existing features 201 in the software application. These tests may be carried out by the users (207) according to certain test methods designed to test those features that are likely to cause a defect or software malfunction. Additionally or alternatively, computer systems may be instantiated to perform automated testing 208. The automated tests perform functions of the software application and verify the results of the functions against an indication of expected results. If the outputs of the automated tests don't match the expected results, it may be determined that some of the features are not working as expected and need further debugging. Thus, each time a new software update or new software release is provided, various automated and manual test methods may be used to test the new features that are introduced. Each new feature may increase the risk of a new defect, especially if the number of affected features 206 is high.

FIGS. 1 and 2 show systems designed to test or validate software applications, and further show how to avoid performing a large number of tests while still properly validating the applications. The embodiments described herein are designed to reduce the number of unit tests that need to be performed in order to validate an application. By reducing the number of unit tests that need to be performed, many central processing unit (CPU) cycles can be saved, along with corresponding consumption of memory and long-term data storage. Many tests also implement networking functionality which can also be avoided using the embodiments herein. Such a reduction in computing and networking resources is a physical, tangible result of performing the methods described herein.

In one embodiment, the computer system 101 of FIG. 1 is configured to reduce the number of unit tests performed for a given software application or group of applications. The computer system first includes accesses a specified version of an application. That version of the application may have many features, each of which will be tested using a specific automated and/or manual test method. The software features may be brand new, or have been updated in the latest version. Or, the software features may have been largely untouched in the latest version. Furthermore, the software application may have a list of known bugs or defects that have already been logged. When these defects are fixed in a new version release, the code related to those defects will have been changed, thus increasing the likelihood that new defects may have been introduced in the new version.

The computer system 101 next evaluates the application to identify connections between software features in the application, and to further identify defects in the software features. Identifying the connections may include searching application code for references or calls to specified software functions. This may be performed automatically upon accessing the application. The connections may include any indication that a piece of code has been used or requested, or that certain data has been fetched, or that certain variables have been implemented. Indeed, the connections may be identified initially, and may be reevaluated at a later time to identify more meaningful or more deterministic connections. Anything in the software code that is calling or sending information, or is asking for data, or is instantiating certain code modules may be identified as being connected. These connections are then used to determine a risk level for upgrading or installing the application.

In at least some embodiments, those software modules that provide new features or updated features may be flagged as high risk for having new defects. Any software modules that are connected to those flagged software modules may also be likely to have new defects. Any software modules not connected to any software modules that were updated or are new may be flagged as having a low risk for new defects. In such cases, unit tests for these low-risk modules may be avoided and the computing resources that would have been used to run those tests may be saved or used on other projects.

The connections between software modules may be identified by users (e.g. by developers or end users), by software routines, or by machine learning techniques. Indeed, machine learning may be used to automatically identify the connections between software features in the application. Over time, as the machine learning techniques analyze more software applications, they will identify more connections, and learn to identify connections more accurately. Machine learning may also be used to learn which connections are likely to be invoked, and where the connections (or associated functions) are likely to break (i.e. result in a defect).

The computer system 101 further determines a risk level for the software features. The risk level indicates a likelihood of a given software feature causing a defect or software malfunction. Once the risk levels have been determined, the method generates a feature list that includes, for at least some of the features, a corresponding ongoing risk indicator that indicates the determined likelihood of the feature causing a defect or software malfunction. These concepts will be explained further below with regard to methods 300 and 600 of FIGS. 3 and 6, respectively.

Figure 3:
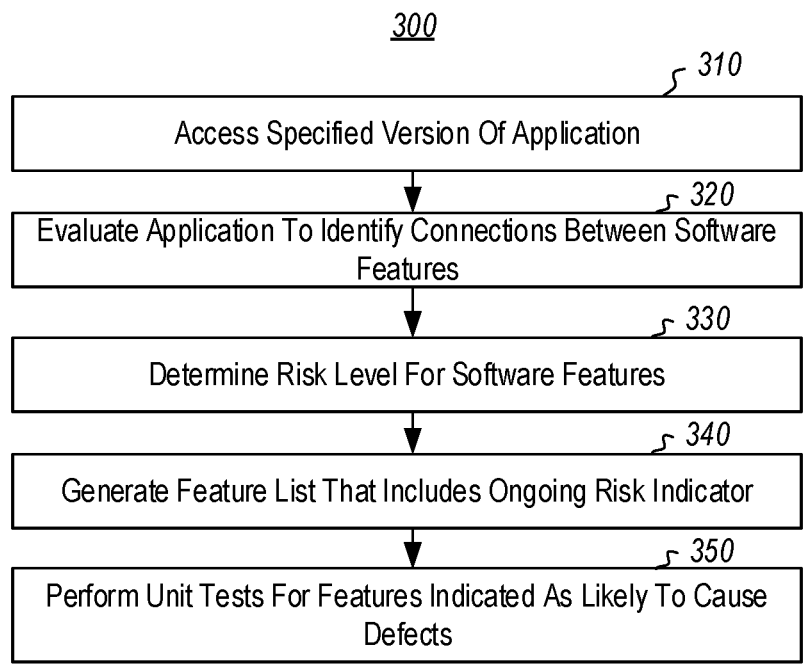
FIG. 3 illustrates an example flowchart of a method for reducing the number of unit tests performed within a system.
Figure 6:
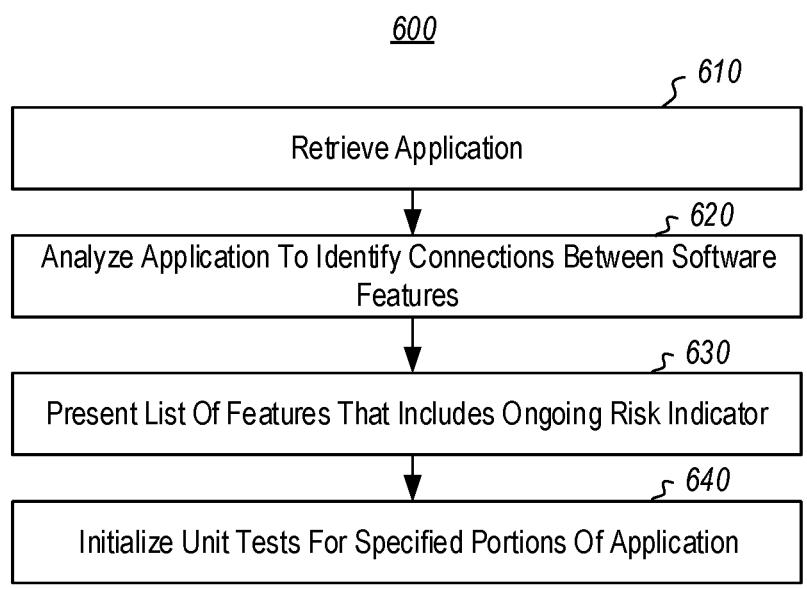
FIG. 6 illustrates an example flowchart of a method for validating a portion of a system using unit tests.

In view of the systems and architectures described above, methodologies that may be implemented in accordance with the disclosed subject matter will be better appreciated with reference to the flow charts of FIGS. 3 and 6. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 3 illustrates a flowchart of a method 300 for reducing the number of unit tests performed within a system. The method 300 will now be described with frequent reference to the components and data of environment 100.

Method 300 includes accessing a specified version of an application (310). For example, application accessing module 106 may access software application 115. The software application 115 may be a current release, an updated release or a new version. The application may include substantially any number of software features 116, where each feature has one or more connections 117 to other features. Each feature 116 also has the potential of having defects 118.

Method 300 next includes evaluating the specified version of the application to identify one or more connections between software features in the application, and to further identify one or more defects in the software features (320). The evaluator kernel 107 may evaluate the software application 115 to identify connections 117 between the features and identify any actual or potential defects 118. The evaluator kernel 107 may be a standalone processing kernel, or may work in conjunction with processor 102 of computer system 101. The connections 117 identified by the evaluator kernel 107 include calls to other features, use of shared libraries or variables, use of shared functionality modules, use of shared repositories, or other connections to other portions of code or data.

Method 300 further includes determining a risk level for one or more of the software features, the risk level indicating a likelihood of the software feature causing a defect or software malfunction according to the identified connections or defects (330). The risk identifier 108 may identify a risk level 109 for each software feature 116 in the application (or for a subset of features). The risk level 109 indicates a likelihood (based on the identified connections 117 and/or defects 118) that the feature 116 will cause a malfunction in the application. Changes to features that have a high number of connections are more likely to cause a defect in the software application.

Using this risk level 109, the feature list generator generates a feature list 111 that includes, for at least some of the features, a corresponding ongoing risk indicator 119 that indicates the determined likelihood of that feature causing the defect or software malfunction (340). As illustrated in the embodiment show in user interface 400 of FIG. 4, the feature list 401 shows a level of risk for each feature 402. For example, the feature "IC Date" has a low (L) system risk 403 and a low upgrade risk 404. It also has a low user interface risk 407. The system risk 403 indicates a likelihood that that feature will cause a malfunction in the current version (i.e. the ongoing risk indicator 119), the upgrade risk 404 indicates the likelihood that that feature will cause a malfunction in the upgraded version, and the UI risk 407 indicates the likelihood that that feature will cause a malfunction in the user interface. It should be noted that all or some of these risk factors may be calculated for each feature. Other features, as noted in the feature list 401 have high system risk, high upgrade risk, and/or high UI risk. Of course, other levels between high and low may be used, and other (perhaps numerical) rating systems may be used in the alternative.

Method 300 includes performing unit tests against the software application for those features that were indicated as sufficiently likely to cause a defect or software malfunction upon installation or upgrade of the application (350). The testing module 113 may perform unit tests 114 against those features that were deemed to need testing. For instance, in FIG. 4, the "Limits Prop" feature has a high (H) system risk and a high upgrade risk. As such, it would be prudent to run a unit test 114 for that feature. If a test was run, it would be assigned a test ID 405, and an indicator 406 would indicate whether the test passed or failed. The pass or fail box may be interactive, and may show (if selected) why the test passed or failed.

In some embodiments, only unit tests for high- or medium-risk features are performed, while in other cases, only unit tests that rate high are performed. This may be changed based on policy, and users may override which tests are to be performed or not performed. By not performing all tests marked as low (as their corresponding code has either not changed or has a low likelihood of having been broken in the new version), the total time needed to validate a new software version may be decreased by hours, days or even weeks. Consequently, many CPU resources that would have otherwise been used in performing those tests can now be used for other productive tasks.

In some embodiments, the risk level 109 is based on two separate risks including an ongoing impact risk (e.g. system risk 403) and an upgrade risk (e.g. upgrade risk 404). The ongoing risk speaks to whether the application will run as intended, and the upgrade risk speaks to whether features will be broken in the upgraded (new) version. These risks are based on identified connections within the application, as well as defects found in the application. If a feature has a high number of connections and defects, it will have a high probability of ongoing impact risk and a high upgrade risk. On the other hand, if a feature has a low number of connections and defects, it will have a low ongoing impact risk and upgrade risk. The risk level may be determined based on multiple different factors for gauging risk including whether the feature has had past problems, whether the feature is highly valuable to the client, whether the feature is highly used, whether the feature is new to the application, etc. These factors may be taken into consideration when determining whether to run a given unit test.

A generated feature list (such as that shown in FIG. 5) may be provided in a user interface 500. Users may be able to select features (e.g. 501-508) or risk level indicators to learn more about the test or risk level. For instance, selecting the low-risk indicator (L) for upgrade risk 503 for Feature #1 may open a new interface which shows a justification for the low-risk indication. Users may thus be able to interact with this feature list 500 to find out more information about a given feature and its connections, and may further interact with the list to specify which tests are to be performed based on determined risk. Users may manually change the risk level for a given feature, for example, so that a unit test is or is not performed for that feature. Users may also make annotations for given features or risk levels or test results. These annotations may be viewable upon selection by a user.

In some embodiments, machine learning may be implemented to identify which unit tests fail, and then update the risk level associated with those unit tests that fail. The feature list 500 of FIG. 5 would thus be updated to reflect the results of the machine learning. The systems herein may thus use machine learning techniques to allow the system to acknowledge to itself which features are high risk (e.g. they have multiple touch points, multiple defects, many lines of code, failed past tests, different languages within the code, etc.), and also learn which features are low risk. The system can then learn over time which features are most likely to fail and can recommend that they be tested by changing the risk level.

In addition to unit tests, user interface tests may be performed to verify UI functionality. Such tests may also be avoided if code related to the UI has not changed between versions, or if new features have not been added. Thus, as with unit tests, the systems herein can learn (or can identify) which pieces of code were touched (i.e. changed) or which pieces of code interact with each other. The systems herein also learn (or identify) which pieces of code were not touched, and further learn which pieces of code have defects, and how long those defects have lasted between versions. All this information can be used to calculate an accurate risk score that, when implemented, will result in the avoidance of many unit tests and/or UI tests.

In some cases, if a feature is used frequently within an application, this may lower the probability of ongoing risk due to the constant use and 'verification' of it working, whereas a feature that is used infrequently may have a higher probability of ongoing risk due to lack of use. The impact in both scenarios would be inverse; that is, a higher use feature would have a higher impact within the system, but may have a lower probability of ongoing risk due to more frequent use. Upgrade risk may potentially be the inverse as well. If a feature is changed, the ongoing risk would go up with extensive use, whereas with a feature not often used, the probability of risk would go down. The systems herein may be designed to track whether a user has used a given feature, and how often that feature has been used. As such, the systems may remove testing from those features that a client has never (or seldom) used. The feature list can be filtered to show or hide or arrange certain aspects as desired by the user. Furthermore, the historical risk can be reviewed and factored in to the risk determinations.

Accordingly, the systems and methods herein may be used to reduce the number of unit tests needed to adequately test a software application. The number of unit tests performed will, in almost all cases, be less than the total number of unit tests provided for testing the application. The unit tests are performed based on the calculated risk level. The risk level may be determined based on multiple risk gauging factors. Each risk gauging factor is specific to a given feature of the software application. The factors may include past use, number of connections, type of feature, importance of the feature to the client, and other factors. The risk level may be determined based on multiple separate risks including an ongoing impact risk, an upgrade risk and a UI risk. In some cases, the risk level is a combined risk level based on both the ongoing impact risk, the upgrade risk, and/or the UI risk. Once the risk has been determined for a given application, and a feature list has been created, the feature list may be presented to users in a user interface (e.g. as shown in FIGS. 4 and 5.

Within this user interface, users may select which unit tests to perform based on the determined risk level for the software features. In some cases, machine learning may be used to analyze the unit tests to identify which unit tests result in failure. Upon completion of these tests, the computer system will update the risk level associated with those unit tests that fail to increase their risk level. The risk level updates may be applied in a proportionate manner to each unit test. As such, unit tests that experienced more failures will receive a higher level of risk proportionate to the number of failures they experienced. The user interface may also allow users to annotate the unit tests to explain why they were run (if manually scheduled) or not run, or why a given risk level was applied or changed. The annotations may be available for viewing in the user interface when selected by the user in the generated feature list. The UI may also provide an indication of why each unit test was assigned a particular risk level. Users may drill down within the UI to find additional details related to each feature, risk level rating, and test result.

FIG. 6 illustrates a flowchart of a method 600 for validating a portion of a system using unit tests. The method 600 will now be described with frequent reference to the components and data of environment 100.

Method 600 includes retrieving at least a portion of an application (610). For example, the application accessing module 106 may access at least some of software application 115. The evaluator kernel 108 then analyzes the retrieved portion of the application to identify one or more connections 117 between software features 116 in the application portion (620). The feature list generator 110 of computer system 101 then presents a list of features that includes a corresponding ongoing risk indicator 119 that indicates a determined likelihood of the software feature causing a defect or software malfunction (630). The testing module 113 initializes unit tests 114 configured to test the portion of the software application for those features that were indicated as sufficiently likely to cause a defect or software malfunction upon installation or upgrade of the application (640). In this embodiment, only a portion of the software application 115 is tested. This avoids many unit tests that would otherwise be run.

Indeed, in many cases, software applications are very large. If the application can be tested in pieces, this can reduce the number of unit tests that need to be run. The portion of the application that is tested can be selected based on a determined risk level for one or more of the software application's features 116. Not only does testing only part of the application avoid having to conduct unit tests for the entire application, it also avoids conducting one or more user interface tests in addition to the unit tests. Machine learning may also be used in this embodiment to learn and automatically identify the connections between software features in the software application or in specific portions of the application.

Accordingly, methods, systems and computer program products are provided which reduce the number of unit tests performed within a system. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A method, implemented at a computer system that includes at least one processor, for reducing the number of unit tests performed within a system, the method comprising:

accessing a specified version of an application;

evaluating the specified version of the application to identify one or more connections between software features in the application, and to further identify one or more defects in the software features;

determining a risk level for one or more of the software features, the risk level indicating a likelihood of the software feature causing a defect or software malfunction according to the identified connections or defects;

generating a feature list that includes, for at least some of the features, a corresponding ongoing risk indicator that indicates the determined likelihood of that feature causing the defect or software malfunction; and performing unit tests against the software application for those features that were indicated as sufficiently likely to cause a defect or software malfunction upon installation or upgrade of the application.

2. The method of claim 1, wherein the number of unit tests performed is less than the total number of unit tests provided for testing the application.

3. The method of claim 1, wherein the determined risk level is based on a plurality of separate risks including at least an ongoing impact risk and an upgrade risk.

4. The method of claim 3, wherein the risk level is a combined risk level based on both the ongoing impact risk and the upgrade risk.

5. The method of claim 1, wherein the risk level is determined based on a plurality of risk gauging factors.

6. The method of claim 5, wherein each risk gauging factor is specific to a given feature of the software application.

7. The method of claim 1, further comprising presenting the generated feature list to one or more users in a user interface.

8. The method of claim 6, further comprising allowing the one or more users to select which unit tests to perform based on the determined risk level for the one or more software features.

9. The method of claim 1, further comprising:
implementing machine learning to analyze one or more of the unit tests to identify which unit tests result in failure; and
updating the risk level associated with those unit tests that fail.

10. The method of claim 9, wherein the risk level updates are applied in a proportionate manner to each unit test, such that unit tests that experienced more failures will receive a higher level of risk.

11. A method, implemented at a computer system that includes at least one processor, for validating a portion of a system using unit tests, the method comprising
retrieving at least a portion of an application;
analyzing the retrieved portion of the application to identify one or more connections between software features in the application portion; determining a risk level for one or more of the software features, the risk level indicating a likelihood of the software feature causing a defect or software malfunction according to the identified connections;
presenting a list of features that includes a corresponding ongoing risk indicator that indicates a determined likelihood of the software feature causing a defect or software malfunction; and
initializing one or more unit tests configured to test the portion of the software application for those features that were indicated as sufficiently likely to cause a defect or software malfunction upon installation or upgrade of the application.

12. The method of claim 11, wherein testing the portion of the application avoids having to conduct unit tests for the entire application.

13. The method of claim 12, wherein testing the portion of the application further avoids conducting one or more user interface tests in addition to the unit tests.

14. The method of claim 11, wherein the connections between software features in the software application comprise references or calls to specified software functions.

15. The method of claim 11, wherein machine learning is implemented to learn and automatically identify the connections between software features in the software application.

16. A computer system for reducing the number of unit tests performed by the computer system, comprising:
at least one processor;
system memory;
an accessing module configured to access a specified version of an application;
an evaluator kernel configured to evaluate the specified version of the application to identify one or more connections between software features in the application, and to further identify one or more defects in the software features;
a risk identifier configured to determine a risk level for one or more of the software features, the risk level indicating a likelihood of the software feature causing a defect or software malfunction according to the identified connections or defects;
a feature list generator configured to generate a feature list that includes, for at least some of the features, a corresponding ongoing risk indicator that indicates the determined likelihood of that feature causing the defect or software malfunction based on the determined risk level; and
a testing module configured to perform unit tests against the software application for those features that were indicated as sufficiently likely to cause a defect or software malfunction upon installation or upgrade of the application.

17. The computer system of claim 16, further comprising a user interface that allows users to annotate one or more of the unit tests.

18. The computer system of claim 17, wherein the annotations are available for viewing in the user interface when selected by the user in the generated feature list.

19. The computer system of claim 17, wherein the user interface provides an indication of why each unit test was assigned a particular risk level.

* * * * *